United States Patent [19]

Monthey et al.

[11] Patent Number: 5,194,208
[45] Date of Patent: Mar. 16, 1993

[54] PROCESS OF CURING A FLEXIBLE HOSE

[75] Inventors: Steven F. Monthey, Candler; Charles S. Pearson, Waynesville; Randall E. Sellers, Sylva, all of N.C.

[73] Assignee: Dayco Products, Inc., Dayton, Ohio

[21] Appl. No.: 349,605

[22] Filed: May 10, 1989

[51] Int. Cl.$^5$ ............................................. B29C 71/02
[52] U.S. Cl. .............................. 264/130; 252/52 A; 264/338; 264/347
[58] Field of Search ...................... 264/130, 338, 347; 427/133, 135; 252/52 A

[56] References Cited

U.S. PATENT DOCUMENTS

| | | | |
|---|---|---|---|
| 3,824,141 | 7/1974 | Miller et al. | 264/347 X |
| 3,972,757 | 8/1976 | Derderian et al. | 264/347 X |
| 4,217,394 | 8/1980 | Newkirk et al. | 427/135 X |
| 4,360,492 | 11/1982 | Rowland et al. | 264/130 X |
| 4,537,736 | 8/1985 | Peitzman et al. | 264/130 |

Primary Examiner—Leo B. Tentoni
Attorney, Agent, or Firm—Joseph V. Tassone

[57] ABSTRACT

Disclosed is a method for curing flexible hose on a mandrel wherein the mandrel lubricant is a polyoxyalkylene based lubricant having a pH greater than 8.0; in the preferred embodiments, the lubricant contains an aminoalcohol; lubricant compositions are also disclosed.

11 Claims, No Drawings

PROCESS OF CURING A FLEXIBLE HOSE

BACKGROUND OF THE INVENTION

The present invention relates to a novel mandrel lubricant and to a method for curing tubular elastomeric products such as flexible hose in which that lubricant is used.

It is known in the art to manufacture flexible hose, such as automotive radiator hose, by sliding a pre-cut length of uncured hose onto a pre-heated mandrel, which is often curved, and then heating and curing the hose. When the hose is cured, the hose substantially retains the mandrel's curved shape. One such method is described in U.S. Pat. No. 4,537,736.

In order to prevent the hose from adhering to the mandrel as it is cured and to enable a worker to remove the cured hose from the mandrel easily and to facilitate loading the hose onto the mandrel, it is common practice to apply a mandrel release agent to the inside of the uncured hose before the hose is slid onto the mandrel. A number of mandrel lubricants have been used for this purpose. Some of the most widely used are polyoxyalkylene based oils, pastes, waxes and greases. These lubricants are desirable because they are water soluble and they can be easily removed by washing with water. Polyoxyalkylene based lubricants are well known in the art. In addition to being described in U.S. Pat. No. 4,537,736, they are also disclosed in U.S. Pat. No. 4,217,394.

In spite of their wide use, polyoxyalkylene based lubricants have not been entirely satisfactory. To cure the hose, the hose is usually heated on the mandrel in an autoclave. At the elevated temperature and pressure of the autoclave and in the presence of steam, these lubricants become acidic due to oxidation of the mandrel lubricants, causing extensive corrosion to the mandrel and metal used in constructing the autoclave. Repair or replacement of the autoclaves with corrosion resistant materials such as stainless steel is expensive. Accordingly, there is a need for a less corrosive mandrel lubricant useful in the manufacture of flexible hose.

SUMMARY OF THE INVENTION

The present invention provides a mandrel lubricant comprising a polyoxyalkylene based oil, paste, grease or wax which is characterized in that it has a pH which is basic and preferably in the range of about 8 to 9.

More particularly, the present invention provides a polyoxyalkylene based lubricant containing a base or buffer such as an amine and more particularly an aminoalcohol. The aminoalcohol neutralizes the polyoxyalkylene making the lubricant less corrosive and more desirable for use.

The present invention also provides a method for manufacturing hose which comprises applying the aforementioned mandrel lubricant to the inside of an uncured elastomeric tubular structure, sliding that tube onto a mandrel, curing the tube on the mandrel, and sliding the cured tubular structure from the mandrel.

DETAILED DESCRIPTION OF THE INVENTION

The lubricant and method of the present invention are useful in curing tubes formed from a wide variety of elastomers such as natural and synthetic rubbers, e.g., styrene-butadiene rubber (SBR), neoprene (CR), and ethylene-propylene-diene monomer terpolymer (EPDM) which may be used alone or blended with urethanes, PVC, polyesters, and the like.

Tubular structures such as radiator hoses are commonly composed of a length of extruded elastomer reinforced by a circumferentially wrapped filamentary material such as a layer of knitted textile fabric such as cotton or rayon fabric, and/or by a circumferentially wrapped metal wire core Methods for manufacturing curable textile-reinforced and wire-reinforced hoses are known in the art, for example, see U.S. Pat. Nos. 3,824,141 and 3,972,757. In one method a curable elastomeric compound is first extruded in tubular form. A reinforcing sleeve or layer structure of metallic or non-metallic filamentary material is then built up on or otherwise applied to the exterior of the extruded tube of elastomer while the same is internally pressurized to prevent collapse, and the resultant composite is then passed through a suitable extruder by means of which an outer covering of curable elastomeric compound is applied over the reinforcing structure. For some types of hose intended for use at higher pressures, one or more additional layers of filamentary reinforcement material, which may be separated from the first reinforcement structure by an interposed layer of elastomeric material, may be incorporated in the hose before the application of the outer covering. The length of uncured hose to be vulcanized is then slid onto a mandrel and heated.

Mandrel lubricants in accordance with the present invention are characterized in that they exhibit a pH of about 8.0 to 9.0 as measured in a 10% solution in deionized water. They are further characterized in that their pH does not fall when they are heated to the curing temperature which is typically about 150° to 200° C. and preferably 175° to 190° C. The high pressure, temperatures and steam present in an autoclave are conducive to oxidation of the lubricant. Oxidation increases the acidity of the lubricant. The lubricant of the present invention is preferably neutralized such that its pH does not fall below about 8.0 upon heating.

The mandrel lubricant of the present invention is readily prepared by adding an aminoalcohol to an otherwise known polyoxyalkylene based lubricant. Polyoxyalkylene based lubricants are preferred because they can be removed easily by washing with water.

There are many examples of polyoxyalkylene based lubricants which are commercially available. Lubricants currently in use are liquid at room temperature but may include solid or semisolid materials. The most typical examples are polyethylene oxide or polypropylene oxide polymers and copolymers. Some examples are MLX 282 and MLX 1381 (polyglycols available from Union Carbide Corporation), Pluronic P-65 and Pluronic P-105 (polyoxyethylenepolyoxypropylene block copolymers available from BASF Wyandotte Corporation), Ucon oils and waxes available from Union Carbide Corporation Particularly preferred lubricants are remeltable and solid or semisolid at room temperature but lubricious liquids at the temperature of the mandrel. They should melt at a temperature of about 25° to 100° C. and have a viscosity less than 4000 cps at temperatures up to 205° F. Solid and semisolid lubricants can be allowed to cool and resolidify after they are applied to the inside of the hose. These lubricants then re-melt as the hose is slid onto the heated mandrel.

Representative examples of amines useful in the lubricant of the present invention include triethanolamine, trimethylamine, dimethylamine, ethylamine, diethylamine, methylamine, N,N-dimethylbutylamine, tetramethylene-1-4-diaminobutane, tribenzylamine, 2,4-dimethyl-3-pentylamine, 2-heptylamine, 2-octylamine, and benzhydrylamine. The preferred amine is an aminoalcohol and more preferably triethanolamine. The amine is generally used in an amount sufficient to bring the pH of the composition to 8.0 to 9.0 and to maintain it above 8.0 upon heating in the autoclave. About 0.5 to 2.0 parts per 100 parts polyalkylene oxide is all that is required. The amount will vary with the nature of the lubricant.

In addition to amines, other buffers or bases may be used to neutralize the lubricant although they are less desirable. These include but are not limited to trisodium phosphate, tripotassium phosphate, sodium hydroxide and potassium hydroxide.

In addition to the buffers or base, it may also be desirable to include other conventionally lubricant additives in the composition. In particular, an antioxidant is used in the composition. Examples include nickel dithiocarbamate but other conventional autoxidants may also be used.

When the lubricant is a liquid, the aminoalcohol or other buffer or base can be added to the lubricant directly where it dissolves. If the lubricant is a solid or semisolid, the aminoalcohol or other buffer or base may be added by melting the lubricant and mixing.

To use the lubricant composition of the present invention a liquid lubricant may be poured over the mandrel or a length of uncured hose may be dipped in the lubricant immediately before sliding the uncured length of hose on the mandrel. When the lubricant is solid it may be applied to the hose by dipping the hose through a melt of the lubricant or it may be coated as a melt on the inside of the hose using a brush or other coating device. Alternatively, it may be applied to the inside of the uncured tube as it is extruded by co extruding the lubricant inside the hose.

Having described the invention in detail and by reference to preferred embodiments thereof, it will be apparent that modifications and variations are possible without departing from the scope of the invention defined in the appended claims.

What is claimed is:

1. In a method for curing a tubular member on a mandrel which comprises:
    applying a polyoxyalkylene based lubricant to the inside surface of an uncured length of a tubular member or to the surface of said mandrel;
    sliding said uncured length of said tubular member onto said mandrel;
    heating said tubular member, and
    sliding said cured tubular member from said mandrel, the improvement wherein said lubricant exhibits a pH greater than 8.0.

2. The method of claim 1 wherein said method includes the additional step of incorporating an amine in said lubricant.

3. The method of claim 2 wherein said amine is selected from the group consisting of triethanolamine, trimethylamine, dimethylamine, ethylamine, diethylamine, methylamine, N,N-dimethylbutylamine, tetramethylene-4-diaminobutane, tribenzylamine, 2,4-dimethyl-3-pentylamine, 2-heptylamine, 2-octylamine, and benzhydrylamine.

4. The method of claim 3 wherein said lubricant is applied to said inside surface of said uncured length of said tubular member.

5. The method of claim 4 wherein said lubricant is an oil.

6. The method of claim 4 wherein said lubricant is a solid or semisolid and said method includes the additional step of melting said lubricant to apply said lubricant to the inside surface of said uncured length of said tubular member.

7. The method of claim 6 wherein said method includes the additional step of allowing said lubricant to cool and re-solidify after applying said lubricant to said inside surface.

8. The method of claim 7 wherein said method includes the additional step of re-melting said lubricant while sliding said uncured length of tubular member onto said mandrel.

9. The method of claim 2 wherein said amine is an aminoalcohol.

10. The method of claim 9 wherein said aminoalcohol is triethanolamine.

11. The method of claim 1 wherein said step of heating said tubular member is carried out in an autoclave using steam to heat said tubular member.

* * * * *